Nov. 28, 1961   J. A. BECKER   3,011,058
RADIANT-ENERGY TRANSLATION SYSTEM
Filed April 1, 1947   2 Sheets-Sheet 1
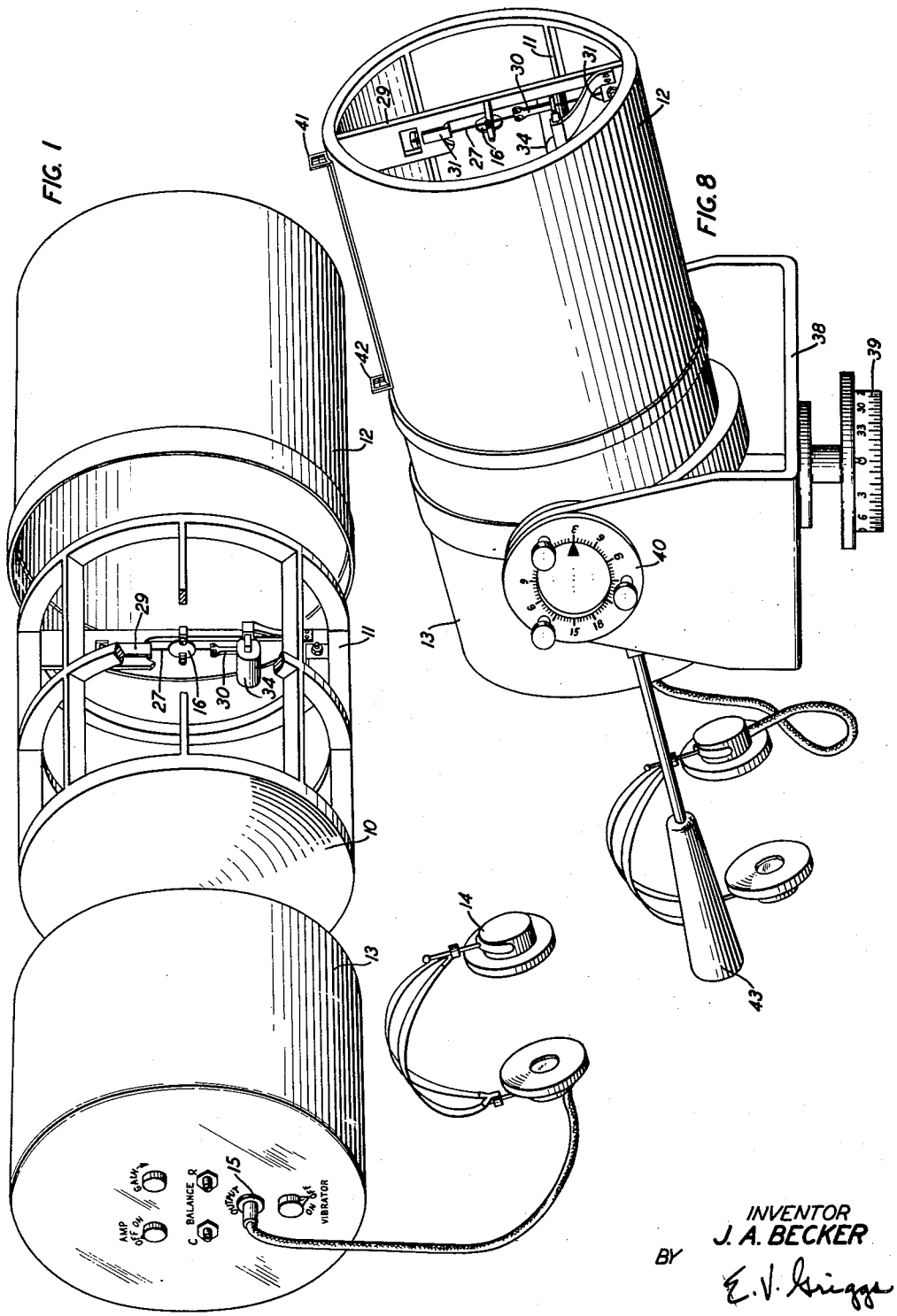
INVENTOR
J. A. BECKER
BY
E. V. Griggs
ATTORNEY Nov. 28, 1961 J. A. BECKER 3,011,058
RADIANT-ENERGY TRANSLATION SYSTEM
Filed April 1, 1947 2 Sheets-Sheet 2
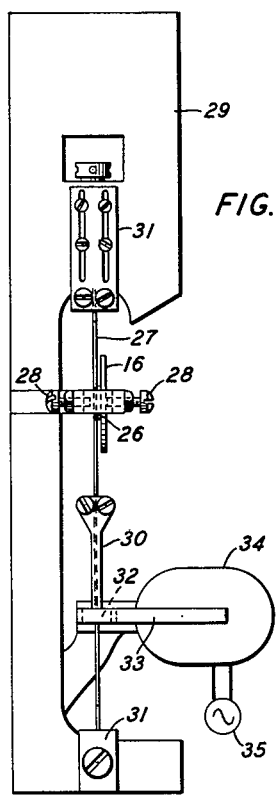
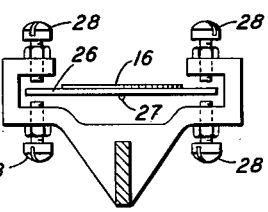
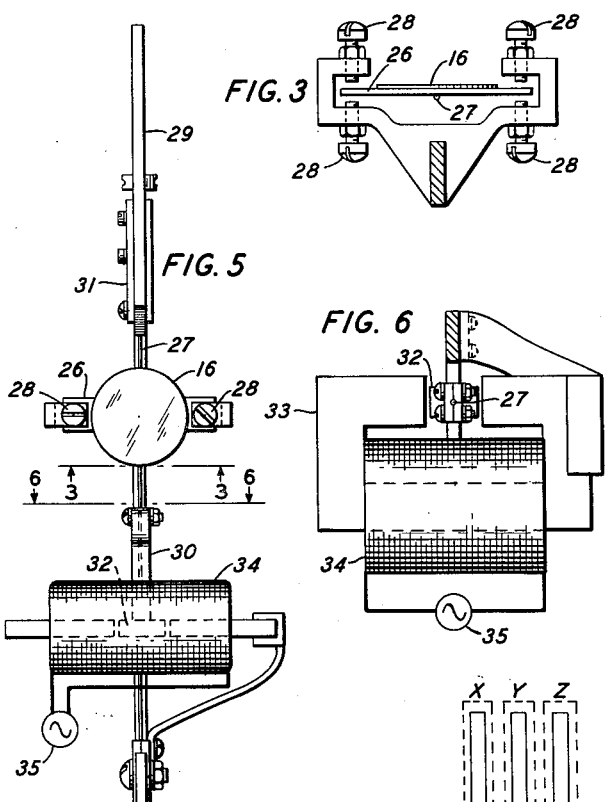
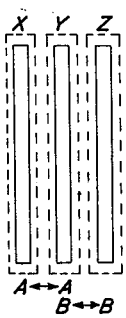
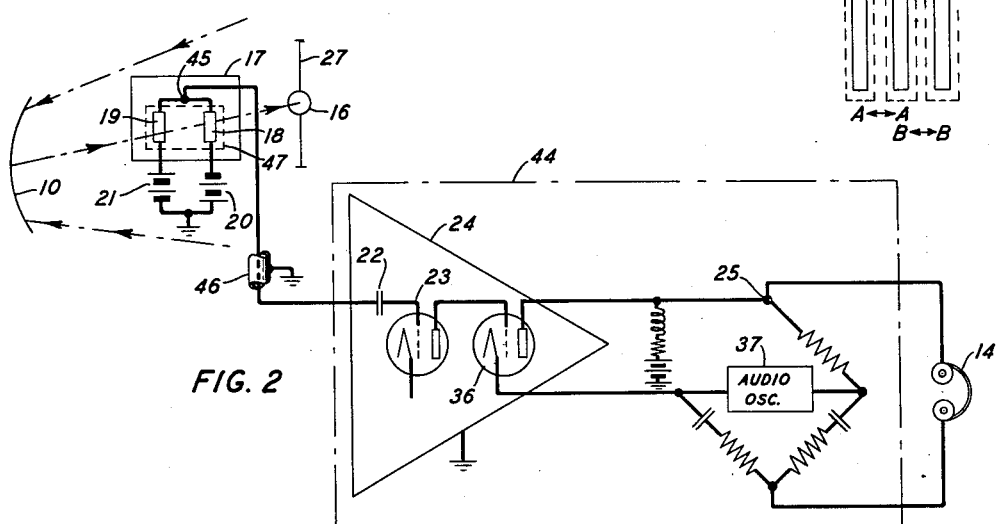
INVENTOR
J. A. BECKER
BY
E. V. Griggs
ATTORNEY

3,011,058
RADIANT-ENERGY TRANSLATION SYSTEM
Joseph A. Becker, Summit, N.J., assignor to Bell Telephone Laboratories, Incorporated, New York, N.Y., a corporation of New York
Filed Apr. 1, 1947, Ser. No. 738,756
4 Claims. (Cl. 250—83.3)

This invention relates to a system for detecting the presence and locating the position of a body by utilizing thermal-radiations emanating from the body. This objective is accomplished by translating the temperature differences existing between a body and its surroundings, so that its location is determined whether the body is encompassed by darkness or is outside the range of ordinary visibility.

An object of the invention is to provide means to determine the azimuth and elevation of a body whose temperature differs from its surroundings.

Another object is to provide a thermal-emission detector of rugged construction and adaptability to outdoor use, yet extremely sensitive to thermal-radiations and substantially non-responsive to interfering mechanical vibrations.

A further object is to provide an improved radiant-energy receiver for radiations of an electromagnetic character in the frequency ranges commonly designated as heat and light.

A still further object is the provision of an efficient thermal-emission resolving system wherein a minimum of disturbing noise effects is obtained.

Other objects and advantages of this invention will appear from a study of the specifications and accompanying drawings.

This invention utilizes that form of radiant-energy which falls under the general designation of thermal-radiation and includes the visible lights, ultra-violet, and infra-red or invisible heat radiations emitted by bodies.

In the embodiment of the invention as shown in the drawings and as disclosed herein, the main components are an optical system and an associated amplifier. The complete system is designed to initiate an aural or visual signal or both whenever a temperature discontinuity source is encountered while scanning an area. Other supplemental parts are a rotatable gimbal for mounting and positioning the system, and an auxiliary indicator unit for recording the signals received by the system. The indicator may comprise a set of earphones, a loudspeaker, or an arrangement comprising an oscilloscope and a means for supplying an aural signal combined with the oscilloscope's visual display, or a recorder mechanism producing a chart record. The optical system is designed to concentrate thermal-emission from a distant object upon a thermistor-strip bolometer, and to furnish an alternating signal substantially independent of any difference between local temperatures and the background temperature of the object viewed. The first-mentioned purpose is attained by using a front surface parabolic reflector, and the other objects are achieved by use of a double-strip thermistor-bolometer, and by reflecting the ray cone from the parabolic reflector upon the dual thermistor strips in an alternate manner. This is accomplished by means of a small plane oscillating reflector, mounted upon a torsional oscillator, which receives collected radiation from the parabolic reflector. By focusing the rays from the oscillating reflector upon each of the thermistor strips in an alternate manner, an alternating signal is obtained which is amplified and fed to an indicating device.

A bolometer is an instrument used to detect or measure small quantities of radiant-heat energy by means of a thermally induced change in its resistance. A thermistor-bolometer is one that is made from thermistor material, which is especially thermal-sensitive and in which the resistance changes much more rapidly with temperature than does the resistance of a metal.

A bolometer may be constructed according to any suitable design, as for example, that disclosed in Patent 2,414,792, issued to J. A. Becker on January 28, 1947. Thermistors may be manufactured as disclosed in Patent 2,414,793, issued to J. A. Becker and H. Christensen on January 28, 1947. Suitable materials are one or more of the oxides of manganese, nickel, cobalt, copper, iron, zinc and uranium. Good results have been obtained with a thermistor material comprising the combined oxides of manganese, nickel, and cobalt.

The system, in accordance with the invention, will indicate the location and direction of heat radiation bodies in relation to the equipment. If the distance of a body from the equipment is desired a pair of detectors may be positioned at separate points on a common base line, and the distance may be readily computed by triangulation methods.

An advantage of the system, as disclosed by the invention, is the fact that the equipment is very compact and self-contained, extremely sensitive and efficient in its operation yet rugged in construction, and is adaptable to rough usage under adverse field conditions.

The invention may be fully understood by referring to the following detailed description studied in connection with the attached drawings.

Referring to the drawings:

FIG. 1 shows an exploded view of a three-part structure containing the system;

FIG. 2 is a schematic drawing of an embodiment of the invention, and shows a double-strip bolometer arrangement biased from a battery source, and shows the interrelationship between reflectors and bolometer, also the amplification configuration and signal indicating device as used in the invention;

FIG. 3 is a section along the plane 3—3 of FIG. 5, viewed in the direction of the arrows, of the oscillating reflector mechanism;

FIG. 4 shows a detailed view of the torsional oscillator arrangement by means of which the plane reflector detailed in FIG. 3 is oscillated;

FIG. 5 is a front end view of the assembled mechanism of FIG. 4;

FIG. 6 is a section of the structure of FIG. 5 along the line 6—6, viewed in the direction of the arrows, and shows the armature and field configuration used to motivate the torsional oscillator;

FIG. 7 is a schematic plan of the angular fields of view of the double-strip bolometer arrangement as used in the system; and FIG. 8 presents the completely assembled system, as used in the invention, mounted upon a rotatable gimbal.

Referring to FIG. 1, it will be noted that the equipment shown therein comprises sections 11, 12 and 13. Frame section 11, which includes a parabolic reflector 10, fits within the container 12, and section 13, in which an amplification unit is housed, slip fits to section 12, within which section can repose the frame arrangement 11. A pair of earphones 14, or any other suitable indication device such as an oscilloscope, recorder, loudspeaker or meter are connected to jack 15, in section 13. The front surfaced parabolic reflector 10, is mounted upon the cylindrical frame 11, and fastened thereto in a careful manner so that the reflector 10 is subject to no distortion except that caused by its own weight. Positioned in front of the focal plane of the parabolic reflector 10, is a small plane oscillating reflector 16, which is mounted as a part of a torsional oscillator, the function and details of which will hereinafter be described. Situated at a position between reflectors 10 and 16, is a bolometer arrangement, not shown in FIG. 1, but shown schematically in FIG. 2, wherein it is designated generally by the numeral 17. This bolometer arrangement, comprising thermal-sensitive elements 18 and 19, is biased from an electromotive source comprising batteries 20 and 21. A junction point 45, situated between the elements 18 and 19 is connected through a condenser 22, to a grid 23, of an amplifier 24, and the amplifier output connects, through a bridge configuration 25, to a signal indicating device 14.

In order to measure the change in the bolometer-strip resistance due to heat developed by the reception of a signal, the thermistor strips are connected together as illustrated in FIG. 2, so as to form arms of a simple bridge network. If this bridge is in balance when no signal or external radiation is received, the impingement of radiation on either of strips 18 or 19, or on both of them in a consecutive manner, will result in a bridge unbalance, and the output voltage developed at point 45, will be a measure of the heat radiation impinging upon the strips. Since the resultant voltage change will be approximately proportional to the bias voltage across the thermistor strips 18 and 19, it is advisable to use as large a bias voltage as is consistent with the other factors involved. By use of the double-thermistor strip arrangement coupled with the oscillating reflector 16, an efficient utilization of the heat radiation is obtained. With the strip bridge circuit unbalanced the potential at the common connection point 45 will vary, thus initiating a voltage variation at point 45, which is passed along to the amplifier 24 in the form of an alternating-current signal. This arrangement permits use of a suitable alternating-current amplifier which is more readily constructed and has well-known advantages over a direct-current amplifier for this type of operation.

Another advantage of the double-strip thermistor arrangement results from the fact that when a single strip is used and the equipment is situated in a high acoustic noise field, as for example in an airplane, an alternating-current potential will develop in the sensitive strip circuit, and this potential will possess the same frequency as the acoustical noise. The extraneous interference tends to balance out when double strips are used. This electrical noise will appear even if the strip is contained within an efficiently sealed bolometer housing unit, for usually such a housing has a window to permit the entrance of radiation, and this window will not be massive enough to sufficiently attenuate the sound pressure. The phenomena of this noise effect seems to be accounted for by the periodic temperature variations in the surrounding atmosphere due to adiabatic expansion and contraction. For a sound pressure of 100 bars, this temperature variation may amount to $10^{-3}$ ° C., and even if only a small fraction is transferred to the bolometer configuration, it will be comparable in its competition with that produced by the legitimate infra-red radiation signals.

Bolometers with two symmetrically placed sensitive elements as used in this invention, produce much less acoustic noise voltages than those with a single element. The acoustic noise effect can be further reduced by constructing the bolometer unit 17, so that it is hermetically sealed, and still further by operating the bolometer unit at reduced pressures such as that exerted by one centimeter of mercury inside its housing, and by keeping the air volume within the housing to as small a volume as is feasible.

Another problem is presented by insulation noise which is due to variations in the leakage resistance to ground from the end of the bolometer unit connected to the grid of the amplifier, and from the lead wire connecting the bolometer to the grid. The resistance between this part of the circuit and ground should be $10^{11}$ ohms or larger, and this part of the circuit should never be exposed to high humidities, but should be protected and shielded therefrom as shown in section symbolically by 46, in FIG. 2.

Microphonic noises within the equipment are caused by the movement of any part of the circuit from the bolometer to the grid of the first amplifier tube. This may include the wiring of the bolometer itself, and the leads from the bolometer to the grid of the amplification unit. This part of the circuit should be mechanically rigid and should be completely surrounded by a metallic grounded shield as shown in FIG. 2. The potential to ground should be zero, or as close to zero as can be obtained. The internal capacity with respect to its shield should be small and any movement between metal parts and insulating supports which might generate frictional charges should be avoided. Rubber or elastic supports usually result in microphonic noise. Rigid glass or quartz supports are usually satisfactory.

Any extraneous electrical noise effects generated in the bolometer unit 17, or in the circuit between the bolometer and its associated amplifier 24, can be still further discriminated against by designing the amplifier so that it is highly selective to frequencies corresponding to the oscillation frequency, but has a sharp cut-off below and above that frequency.

Thermal-emission systems, especially those systems used for detecting weak emission sources, are highly vulnerable to extraneous noise effects, but by use of the protective factors enumerated above it has been discovered that extraneous noise effects can be reduced to an unobjectionable minimum.

Referring to FIG. 3, herein the plane oscillating reflector 16 is shown attached to a steel bar 26, and the bar 26 is secured to a supporting wire 27. The steel bar and its connected reflector are free to oscillate about the wire 27, within the confines provided by the adjustable stops 28. When the wire 27 is oscillated, the bar 26 moves between the adjustable stops 28, hitting equally on alternate pairs of stops at each extremity of its oscillatory movement. If the amplitude of the excursions of the bar 26, without the stops 28, is large compared to the amplitude when the stops 28 are adjusted, the bar 26 spends most of the time at the points of its extremities of motion, but is oscillated back and forth between the stops at whatever frequency is desired. In the embodiment of the invention disclosed a rate of 20 cycles per second was found satisfactory. The amplitude of excursion is fixed by the adjustable stops 28, and the final oscillation frequency is determined by the system's natural period.

FIG. 4 shows the plane oscillating reflector 16 attached to the bar 26 which is secured to the wire 27, and forms a part of a torsional oscillator constructed as follows. A 4-inch length of 0.16-inch diameter steel wire 27, is connected through a wire guide 30 between points of the frame 29, by means of adjustable clamps 31. A soft iron armature 32 is fastened at a point to the steel wire 27, and acts thereon as an inertia load so as to furnish to the system the natural frequency desired. Sustained oscillations are obtained by driving the system magnetically. A field piece 33 is wound with 8,000 turns of No. 36 enamel wire 34. A make and break contact in the oscillating system alternately connects and disconnects this coil 34 to a dry cell battery. This part of the arrangement is shown schematically and designated as 35. A condenser may be positioned in parallel to coil 34, for the purposes of reducing contact sparking, and to assist in setting the oscillation frequency. While the tension on wire 27 does not affect the frequency, the tension strain and the oscillating strain tend to add, and it is found advisable to keep their sum below the elastic limit. Sufficient tension is applied to make the operation independent of the system's orientation with respect to the earth, and the wire tension adjustable clamps 31 are provided for this purpose.

FIG. 5 displays a front end view of the plane reflector oscillation system, while FIG. 6 portrays a detailed view of the field and armature arrangement used to actuate the oscillator as described above.

Returning to FIG. 2. The field of view of the optical system is determined by the size of the bolometer strips 18 and 19. While it will be readily understood that the bolometer used may comprise any radiant-energy sensitive element responsive to thermal-emissions, such as a thermopile, thermocouple or photocell, a thermistor-strip bolometer is preferred in this embodiment of the invention.

Since the apparatus is primarily used to view distant objects the bolometer 17 is placed in front of the system's focal plane. The angular field of view in radians is then the ratio of the strip dimensions to the focal length. In the embodiment as described, each strip is approximately 3 millimeters by 0.2 millimeter with 0.6 millimeter spacing center to center between strips. The field of view along the length of the strip is .02 radian or 70 minutes, and across the strip it is .0013 radian or 4.5 minutes, and the effective angular separation of the strips is .004 radian or 14 minutes. When using the equipment to view an object whose width extends 2.0 mils or less against a uniform background three signals may be obtained, one strong when the equipment is pointed directly at the object, and two weak signals of a strength of approximately half the strong signal, when pointed 4 mils to either side of the object. Likewise when crossing a boundary or edge formed by a large object extending much more than 4.0 mils against its background, two distinct signals 4.0 mils apart or at a ±2.0 mils angle on each side of the boundary are usually obtained. More complicated signals are observed when two or more objects are close together, or when the background is not uniform. It will also be appreciated that a point source at a large distance does not convey a point image for its radiation is spread over the area of a small circle. The diameter of this circle of confusion is to a large extent dependent on the perfection of the parabolic reflector. Sometimes the circle of confusion is larger than the width of the bolometer strips and consequently the radiation image is somewhat blurred. Again referring to the drawings, the angular fields of view of the bolometer strips are shown in FIG. 7. The projection of strip A is either in position X, and strip B in position Y, or strip A in position Y and strip B in position Z, depending upon which extremity of oscillation the vibrating reflector 16 of FIG. 3 is positioned. The continuous lines of FIG. 7 are for the cases of perfect optics, and the dashed lines are the approximate boundaries actually obtained due to the finite circle of confusion. If the integrated radiation is the same from each side of the positions X, Y and Z of FIG. 7, then no signal will result because the bolometer circuit is then in balance. Any difference such as that due to the presence of an object in either positions X, Y or Z will originate a signal, and the strongest signal will be obtained when the object is in position Y. This phenomena is occasioned by the fact that when radiant-energy galls on one of the bolometer strips, this strip is heated rapidly and its temperature raised slightly. As a result the resistance of the strip is decreased slightly and the bolometer circuit is unbalanced. The strongest signal occurs when the object is centered by the equipment. The double-strip thermistor-bolometer system as before stated, is centered on the optical axis, and the strips are placed in the focal plane of the whole optical system. If the bolometer arrangement is furnished with a window 47, of any suitable material, such as rock salt, it will be appreciated that a 1.5-inch path length in air is approximately equal to 1.0 inch through rock salt, and a slight adjustment in bolometer position is necessary to correct for this effect. The window may comprise a sheet of silver-chloride which has the ability to pass infra-red radiations. If it is desired to exclude ultra-violet radiations the silver-chloride may be coated with gilsonite, and if it is desired to also exclude visible lights, the silver-chloride may be coated with silver-sulphide or any other suitable substance. With proper construction stray radiation falling on the bolometer from local objects will be constant, and the signal obtained will be independent of differences between local temperature and background temperature. The motion described by the oscillating reflector is equivalent to a periodic square wave of fixed periodicity. Thus the radiation from the object viewed is compared with radiation from the object's immediate surroundings, and viewed at a frequency of 20 cycles. Radiation coming from a distant object impinges upon the parabolic reflector, and is directed to the oscillating reflector which focusses it upon the strips of the bolometer in an alternate manner. When a region is surveyed the apparatus accepts all the radiation from that region that is not absorbed by the atmosphere, or lost on reflection. This accepted radiation includes actual radiation coming from the region viewed and due to the absolute temperature and emissivity, plus any reflected or scattered radiation falling on the viewed region from other sources. The equipment compares the total radiation from a given object with the total radiation from each side of the object, as is schematically illustrated by FIG. 7. Whether or not a signal is obtained depends on the magnitude of this difference. The response of the apparatus is not a linear function of signal strength, for the signal increases rapidly at first with increase of radiation strength and then saturates. Range depends upon the size of the object viewed as well as the contrast of the object and the surroundings. If an object is large so that its image completely covers a bolometer strip in all dimensions, then other components being equal, the gain necessary to detect the object is independent of distance until a point is reached where the entire strip length is not covered by the image. The gain necessary then increases in proportion to the distance up to the point where the image is smaller than the strip width, and from there on the gain necessary increases as the square of the distance, until such time as the signal disappears into the background interference. If the atmospheric absorption is large the necessary gain is increased proportionally.

Some typical ranges obtained by this equipment are as follows: the detection of a man's hand at a distance of 500 feet, a man at 1,000 to 2,000 feet, a landing craft tank on water at 8,000 to 10,000 yards, and large heat sources such as power plants or battleships at upwards of 10 miles.

The amplification unit arrangement generally designated 44, in FIG. 2, is constructed on a design well known to those skilled in the art. The amplifier should be so designed as to have a sharp cut-off for frequencies above and below the predetermined input frequency, which in this embodiment was 20 cycles. The amplifier may comprise a three-stage amplifier selective with respect to the 20-cycle signal frequency produced by the optical system and may use any suitable tubes such as Raytheon CK505AX hearing aid type tubes. In the embodiment shown a bridge configuration 25 followed a two-stage amplification 24, and employed the plate impedance of a tube 36 as a bridge arm. Another tube, schematically shown and titled 37, is employed as an audio oscillator and serves to excite the bridge. The application of a 20-cycle signal unbalances the bridge circuit at a 20-cycle rate, and results in the origination of an audio tone of the frequency of the audio oscillator 37 with a 20-cycle modulation in the indicating device 14. The amplifier arrangement 44, is housed in a cylinder whose diameter provides a slip fit to connect to the section containing the optical units. Contained within the amplifier cylinder are the batteries required to supply the bolometer 17, amplifier 24 and the oscillator unit.

Another noise problem encountered includes the shot effect, the flicker effect and mechanical resonance or microphone effects. These noises in the embodiment of the invention described are confined to the amplification unit, and result from tube noises, and are likely to be more pronounced at low frequencies than at high frequencies. Some types of tubes are more free of noise than others, and even in tubes of the same type there is likely to be considerable variation from tube to tube. Careful tube selection of unusually quiet tubes will minimize this problem.

Equipment controls are located on the rear face of the cylinder housing 13 as shown in FIG. 1, and comprise separate off-on switches for the amplifier and vibrator, a gain control, adjustments for both the resistance and capacitance balance of the bridge type modulator, also a signal indicator connector jack 15. As has been stated, a variety of signal indicating devices may be used with the equipment. For a single observer in a locale of low ambient noise, the earphones are probably the best. In places of high ambient noise level, the visual signal obtained by using an oscilloscope arrangement is preferable. An operator soon learns to distinguish between random noise and a signal, since the signal always has the regular 20-cycle beat which is not present in random noise. This beat can be heard in an aural signal device, or seen as a flicker in a visual indicating system. While the equipment was primarily designed for operation with the oscillating reflector, it can also be readily used without this reflector, or when the vibrating reflector is held inoperative, and signals will then be obtained when the target image crosses the bolometer strips.

Referring to FIG. 8, herein is shown the complete system mounted upon a rotatable gimbal 38. The indicating dials 39 and 40 are calibrated in degrees to register azimuth and elevation respectively. Sighting equipments 41 and 42 are positioned upon the device, and a handle 43 is provided for the motivation of the detection system in scanning an area.

Although this invention may take numerous forms only one system is herein illustrated and described, and accordingly the scope of the invention is limited only as limitations are expressed in the following claims.

What is claimed is:

1. In a radiant-energy translation system for the reception of radiant-energy from an object in a field of scan, the combination of an amplifier selectively tuned to a specific frequency, a harmonic torsional oscillator tuned to the response frequency of said amplifier, an oscillating reflector teamed in oscillatory compendency with said oscillator, a parabolic reflector for collecting radiant-energy radiation from the field and directing it upon said oscillating reflector, means comprising a plurality of radiant-energy sensitive elements, said oscillating reflector focussing said radiation upon said elements in an alternative manner so that said radiations impinge upon said elements at a rate corresponding to the response frequency of said amplifier, a circuit connecting said elements and amplifier, signal means connected to said amplifier for producing a signal related in amplitude to the intensity of the radiation emitted by said object and means associated with said reflector to indicate the azimuth and elevation angles of the object with respect to a known bearing in a horizontal plane.

2. The combination of claim 1 in which the radiation is infra-red radiation and the modulation thereof is at a rate of 10 to 30 times per second, and said sensitive elements are a double-strip bolometer of the thermistor type.

3. In a thermal-energy translating system for detecting and locating an object in a field of scan, said object having a temperature different from the temperature of said field per se, the combination of an amplifier selectively tuned to a particular frequency, a harmonic torsional oscillator tuned to the response frequency of said amplifier, a reflector mounted upon said oscillator, means for collecting thermal-energy radiations from said field and directing them upon said reflector, a bolometer comprising a housing having a window situated therein, a plurality of thermal-energy sensitive elements within said housing behind said window, said reflector situated to redirect the collected radiations through said window upon members of said element plurality in a successive and repetitive manner, a circuit connecting said elements and amplifier, and means including said elements for initiating voltage variations in said circuit in accordance with variations in the amounts of the collected radiations.

4. In a thermal-energy translation system for detecting and locating an object in an area under observation, said object having a different thermal diffusiveness than that of said area per se, the combination of a harmonic torsional oscillator, a reflector mounted for oscillation upon said oscillator, means for collecting thermal-energy radiations from said area and directing them upon said reflector, a bolometer comprising a housing with a window situated therein, a pair of thermal-energy sensitive elements situated within said housing behind said window, said reflector situated to direct the collected radiations through said window upon said element pair in a successive and repetitive manner, an amplifier selective to the frequency of the reflector oscillation, and a circuit connecting said element pair and said amplifier.

References Cited in the file of this patent
UNITED STATES PATENTS

| | | |
|---|---|---|
| 1,099,199 | Parker | June 9, 1914 |
| 1,553,789 | Moeller | Sept. 15, 1925 |
| 1,789,686 | Ranger | Jan. 20, 1931 |
| 2,175,890 | Glowatzki | Oct. 10, 1939 |
| 2,403,066 | Evans | July 2, 1946 |
| 2,413,021 | Wolfson et al. | Dec. 24, 1946 |
| 2,423,885 | Hammond | July 15, 1947 |